(12) United States Patent
Fritzbøger (10) Patent No.: US 9,351,483 B2
(45) Date of Patent: May 31, 2016

(54) RAT TRAP

(75) Inventor: Preben Fritzbøger, Helsinge (DK)

(73) Assignee: Wisecon A/S, Helsinge (DK)

( * ) Notice: Subject to any disclaimer, the term of this patent is extended or adjusted under 35 U.S.C. 154(b) by 639 days.

(21) Appl. No.: 12/866,163

(22) PCT Filed: Feb. 6, 2008

(86) PCT No.: PCT/EP2008/051456
§ 371 (c)(1),
(2), (4) Date: Sep. 15, 2010

(87) PCT Pub. No.: WO2009/097898
PCT Pub. Date: Aug. 13, 2009

(65) Prior Publication Data
US 2011/0056117 A1 Mar. 10, 2011

(51) Int. Cl.
*A01M 23/36* (2006.01)
*A01M 23/38* (2006.01)
*A01M 27/00* (2006.01)
*A01M 31/00* (2006.01)

(52) U.S. Cl.
CPC ............... *A01M 27/00* (2013.01); *A01M 23/36* (2013.01); *A01M 23/38* (2013.01); *A01M 31/002* (2013.01)

(58) Field of Classification Search
CPC ..... A01M 23/36; A01M 23/38; A01M 19/00; A01M 27/00
USPC ..................................... 43/77–80, 98, 99, 58
See application file for complete search history.

(56) References Cited

U.S. PATENT DOCUMENTS

| 351,678 | A | * | 10/1886 | Williams | ............... | A01M 23/36 |
|---|---|---|---|---|---|---|
| | | | | | | 43/80 |
| 2,107,080 | A | * | 2/1938 | Mitchell | ............................ | 43/64 |
| 2,247,931 | A | * | 7/1941 | Vincent et al. | ..................... | 43/99 |
| 4,109,406 | A | * | 8/1978 | Denninger | ........................ | 43/84 |
| 4,483,094 | A | * | 11/1984 | McKee | .............................. | 43/99 |
| 4,596,087 | A | * | 6/1986 | Pratscher | .......................... | 43/79 |

(Continued)

FOREIGN PATENT DOCUMENTS

| DE | EP 1400172 A1 | * | 3/2004 | ............ | A01M 23/36 |
|---|---|---|---|---|---|
| DK | WO 2010130262 A2 | * | 11/2010 | ............ | A01M 23/38 |

(Continued)

OTHER PUBLICATIONS

Examination Report dated Mar. 4, 2014 which issued in corresponding Danish Application Serial No. BA201400011.

*Primary Examiner* — Darren W Ark
(74) *Attorney, Agent, or Firm* — Fish & Richardson P.C.

(57) ABSTRACT

A rat trap (1) comprising a power supply (80) and means (3) for killing a rat and a first sensor adapted to detect the presence of a rat in the space within the reach of the killing means and where control means are arranged capable of receiving a signal from the first sensor, and being adapted for activating the killing means (3) to kill the rat when the presence of the rat is detected by the sensor according to the invention the trap further comprise a second sensor (85) for detecting light, and the control means is capable of receiving a signal from the second sensor (85) and being adapted for deactivating the killing means (3) or the first sensor for a period of time after the detection of light by the second sensor. Hereby it is possible to prevent accidents due to e.g. erroneous activation of the trap in case of ordinary localized work illumination, including e.g. also in daylight at ground level or in artificial work illumination at the bottom of a shaft.

14 Claims, 5 Drawing Sheets

(56) References Cited

U.S. PATENT DOCUMENTS

| | | | |
|---|---|---|---|
| 4,612,724 A * | 9/1986 | Alboainin | 43/79 |
| 4,653,221 A * | 3/1987 | Pratscher | 43/79 |
| 4,741,121 A * | 5/1988 | Pratscher et al. | 43/74 |
| 5,185,953 A * | 2/1993 | Gross | 43/76 |
| 5,603,287 A * | 2/1997 | Houck | 119/719 |
| 5,815,982 A * | 10/1998 | Garretson | 43/73 |
| 5,915,332 A * | 6/1999 | Young et al. | 119/421 |
| 5,918,409 A * | 7/1999 | Carnwath | 43/99 |
| 5,926,997 A * | 7/1999 | Wilcox | 43/60 |
| 5,953,853 A * | 9/1999 | Kim | 43/98 |
| 6,052,066 A * | 4/2000 | Su | 43/132.1 |
| 6,088,948 A * | 7/2000 | R.o slashed.nnau | 43/72 |
| 6,445,301 B1 * | 9/2002 | Farrell | A01M 31/002 43/58 |
| 6,718,688 B2 * | 4/2004 | Garretson | 43/121 |
| 6,802,152 B2 * | 10/2004 | Hagen | A01M 27/00 43/80 |
| 6,807,767 B1 * | 10/2004 | Schade | 43/77 |
| 7,051,472 B1 * | 5/2006 | Kelly | 43/61 |
| 7,076,913 B1 * | 7/2006 | Dow et al. | 43/79 |
| 7,088,251 B2 * | 8/2006 | Weilbacher, Jr. | A01M 31/002 43/80 |
| 7,530,195 B2 * | 5/2009 | Muller et al. | 43/98 |
| 7,854,089 B2 * | 12/2010 | Deibert | 43/99 |
| 8,042,299 B1 * | 10/2011 | Brown, Jr. | 43/80 |
| 8,388,222 B2 * | 3/2013 | Potter et al. | 374/104 |
| 8,635,806 B2 * | 1/2014 | Gardner et al. | 43/58 |
| 8,640,379 B2 * | 2/2014 | Clark et al. | 43/80 |
| 9,015,987 B2 * | 4/2015 | Moran | A01M 23/16 43/58 |
| 2006/0123693 A1 * | 6/2006 | Muller et al. | 43/99 |
| 2008/0092431 A1 * | 4/2008 | Fritzboger | 43/79 |
| 2009/0199457 A1 * | 8/2009 | Grigorov et al. | 43/99 |
| 2010/0031555 A1 * | 2/2010 | Le Laidier | A01M 23/33 43/77 |
| 2012/0266519 A1 * | 10/2012 | Wright | 43/113 |
| 2014/0373430 A1 * | 12/2014 | Knudsen | A01M 23/38 43/98 |

FOREIGN PATENT DOCUMENTS

| | | | |
|---|---|---|---|
| EP | 1400172 | 3/2004 | |
| EP | 1400172 A1 * | 3/2004 | A01M 23/36 |
| FR | 2900542 | 11/2007 | |
| JP | 2003325092 A * | 11/2003 | A01M 23/36 |
| WO | 2008046424 | 4/2008 | |
| WO | WO 2008046424 A1 * | 4/2008 | A01M 27/00 |

* cited by examiner

RAT TRAP

CROSS REFERENCE TO PRIOR APPLICATIONS

This is a U.S. National Phase application under 35 U.S.C. §371 of International Patent Application No. PCT/EP2008/051456, filed Feb. 6, 2008, which is incorporated by reference herein. The International Application published in English on Aug. 13, 2009 as WO 2009/097898 under PCT Article 21(2).

The present invention relates to a rat trap comprising a power supply and killing means for killing rats, and where a first sensor is arranged being adapted to detect the presence of a rat in the space within the reach of the killing means, and control means being arranged for receiving a signal from the first sensor, and being adapted for activating the killing means to kill the rat when the presence of the rat is detected by the sensor.

Rats in the sewage system are an ever increasing problem which entails considerable problems of a technical as well as a sanitary nature. For instance, rats may cause damage by perforating sewer pipes and building nests in the soil surrounding the pipes. Thereby the pipes may settle and become leaky, but they may also be clogged due to rats' nests literally blocking or the pipes may even collapse when the surrounding soil yields due to sometimes very large rats' nests. Thereby sewage water seeps out into the surroundings with ensuing increased risks of spread of diseases. Besides, the rats themselves spread diseases and since they are able to travel considerable distances they are, regrettably, a considerable source of disease spreading. It is therefore important—not only from a health point of view, but also from a financial point of view—to exterminate rats in general and including in the sewer system.

It has therefore been attempted to use both mechanical and chemical means to eliminate rats, but both methods are associated with deficiencies and weaknesses. For instance, rats adjust very easily which is also reflected in their unique ability to develop resistance to the poisons used, and therefore it has continuously been necessary to develop and use increasingly more aggressive poisons that are poisonous not only to humans, but also to many of our useful animals that are consequently unintentionally exposed to serious risk of poisoning.

The purely mechanical solutions such as eg snares or drop traps have been found to have weaknesses, rats being intelligent animals with high learning abilities. Precisely those properties mean that the rats are very conscious about eg a dead rat being a clear signal of danger and consequently they avoid, to a large extent, areas where there have been or still are dead animals in such mechanical traps. This pattern of behaviour thus entails problems in connection with the mechanical traps that consequently need careful emptying and/or frequent moving since, as mentioned, the rats quickly avoid the surroundings where such traps occur.

From EP patent application no. 1400172 is known a rat trap comprising electronically sensing of the presence of a rat, and automatic means for killing the rat when it is in the operating area of the killing means.

This kind of traps has proven to be very efficient as they provide the possibility of operating to kill several rats without the need of manually activating and emptying the rat trap. A dead rat will disappear in the sewer pipes after being released from the rat trap and the rat trap can thereafter be activated again.

One problem with this kind of rat traps is however that a person working in a shaft or a sewer pipe may accidentally put e.g. a hand into the operating area of the killing means without knowing that the rat trap is installed and active, and this might activate the killing means in the rat trap and thereby the risk of hurting this person. According to EP patent application no. 1400172 this can be avoided by the use of mechanical barricading of the sewer pipe or by means of a light ray and means for sensing interruption of the light ray, and deactivating the killing means.

Based upon the above it is the purpose of the present invention to provide a rat trap for efficient killing rats in sewers and wells, and where safety is further improved.

This is obtained by means of a rat trap as mentioned above in the introduction, and where the rat trap further comprises a second sensor for detecting light, and in that the control means is capable of receiving a signal from the second sensor and being adapted for deactivating the killing means or the first sensor for a period of time after the detection of light by the second sensor.

Hereby is obtained that the rat trap deactivates the killing means whenever ambient light is present in the sewer pipe or the well. By providing the trap with means for switching off the killing means when a light intensity above a given level occurs, it is possible to prevent accidents due to e.g. erroneous activation of the trap in case of ordinary localised work illumination, including e.g. also in daylight at ground level or in artificial work illumination at the bottom of a shaft. Such light-activated safety means may of course also be adapted to be such that they switch off the trap merely if a superposed well cover is opened in daylight.

In an embodiment of the invention the first sensor is adapted for sensing infrared light. Hereby is obtained that the first sensor will operate in a dark space without the need for illumination of any kind as the rat itself is emitting infrared light In this relation it would be advantageous if the second sensor is adapted for sensing visible light, and the control means is adapted for deactivating the killing means when the second sensor senses light above a given intensity, or when the second sensor senses that the ambient light intensity increases.

In an advantageous embodiment the rat trap is constructed so that the killing means is contained in a trap housing, and that the power supply is a battery contained in a battery housing being separate from the trap housing, and that electric wiring is arranged between the battery housing and the trap housing for conducting power from the battery to the trap housing. Hereby is obtained that the trap housing can be installed and positioned in a shaft so that the killing means is able to operate right in front of a sewer pipe entrance to the well, and the separate battery housing can be mounted above the trap housing and below the well cover. In this way easy access to the battery housing is provided without the need for removing the complete rat trap including the trap housing, and at the same time the battery housing including e.g. the control means and other sensitive equipment is mounted away from the sewage pipes.

For the skilled person it is easily recognized that such a separate battery housing and control means as disclosed in this document may also be used in connecting with rat traps in general, whether or not being provided with sensors for sensing ambient light.

In this relation a third sensor can mounted in the battery housing for detecting light, and the control means being capable of receiving a signal from the third sensor, and for deactivating the killing means or the first sensor for a period of time after the detection of light by the third sensor, and also the control means can advantageously be contained in the separate battery housing.

In an embodiment the rat trap can furthermore comprise electronic means for wireless transfer of operational parameters to a receiver unit at e.g. ground level.

As mentioned above the present invention also provides a new method of installing a rat trap in a shaft having a well cover and one or more sewer pipe entrances. According to this invention the trap housing is positioned so that the killing means is able to operate right in front of a sewer pipe entrance, and the battery housing is mounted above the trap housing and below the well cover to provide easy access to the battery housing e.g. for changing the battery or for monitoring the condition of the rat trap According to one embodiment the rat trap and preferably the battery housing can comprise electronic means for recording and storing information regarding operational parameters such as the number of firings or eg the battery state of the trap or its available memory. By configuring the rat trap with an electronic memory it is possible, at any time, to obtain a clear indication whether the trap is active and hence kills many rats or whether the trap is inactive. In particular information on inactivity may be a very useful indication that something is wrong and that consequently the mechanical state of the trap needs to be checked. It may also be that the trap is quite simply to be moved as the information indicates that rats do no appear in the vicinity of the trap.

According to one further embodiment the trap or the battery housing comprises electronic means for wireless transmission of operational parameters to a receiver unit eg at ground level. By transferring operational parameters to ground level, the need to inspect or collect the unit manually is obviated, and consequently the need for sending crew into the sewage system is limited.

According to a further embodiment the trap comprises electronic means for transferring operational parameters to a network such as eg a mobile telephone network. Thereby the rat trap can be monitored from a distance or remote-operated, via eg the internet. By providing the trap with such means several traps can be monitored centrally, and therefore it is possible not only to save crew, but it is also an option to provide improved numerical processing of information such as eg current information on the amount of rats in given geographical zones. However, it is also an option to switch off the trap prior to inspection or mounting. Thereby it is also possible to avoid accidents in connection with unintentional firings during eg mounting or inspection. Also, it is possible to test the functionality of the trap by remote-firing it or even to completely switch off the trap if it malfunctions in one way or another.

The wireless communication as such via the mobile network can easily be established by means of eg a small antenna at ground level which is connected via a cable to the trap.

By providing the trap according to the invention as mentioned above with means for switching off the killing means when a light intensity above a given level occurs, it is possible to prevent accidents due to eg erroneous activation of the trap in case of ordinary localised work illumination, including eg also in daylight at ground level or in artificial work illumination at the bottom of a shaft. Such light-activated safety means may of course also be adapted to be such that they switch off the trap merely if a superposed well cover is opened in daylight.

Other embodiments are recited in the dependent claims.

LIST OF FIGURES

Now the invention will be described in further detail with point of departure in the figures; wherein FIG. 1 schematically shows the construction of an embodiment of the rat trap.

Figure 1:
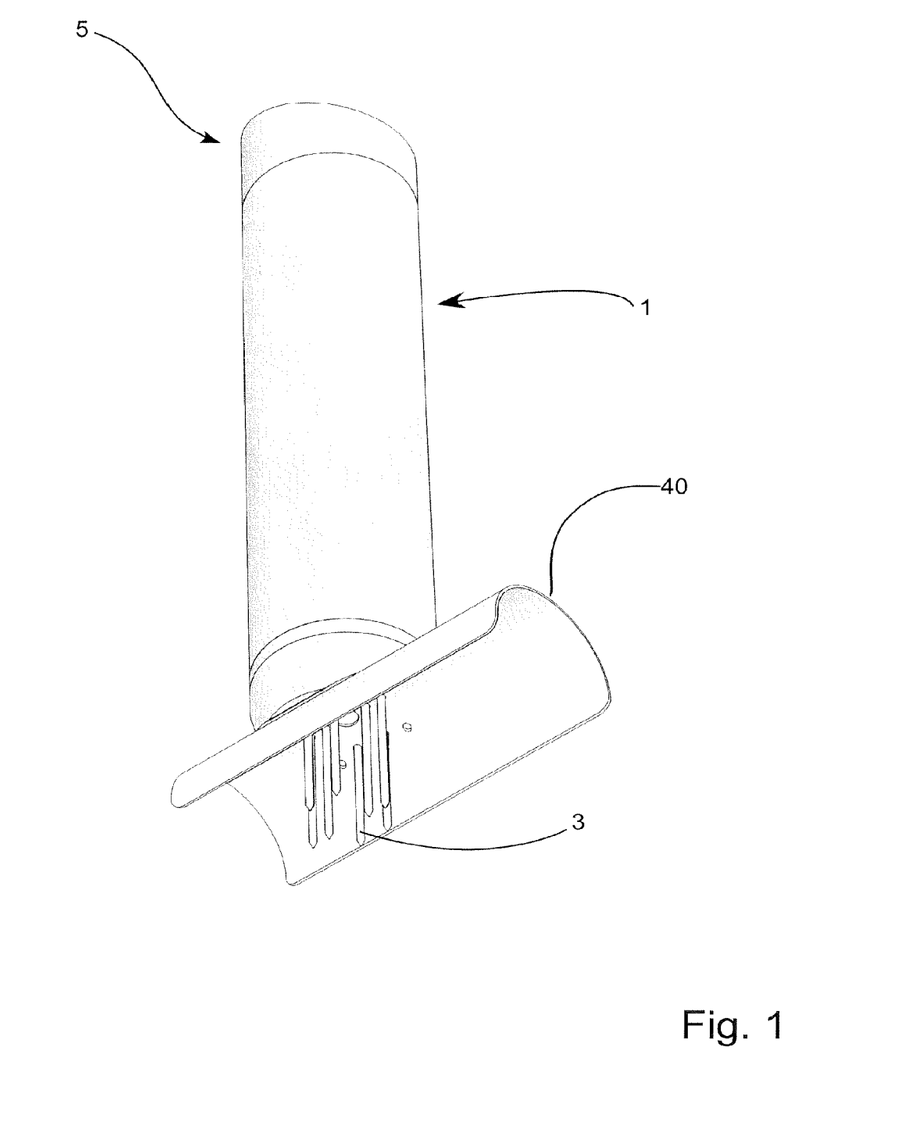

Reference being initially made to FIG. 1, an embodiment of the invention will be explained in further detail. The rat trap 1 comprises an automatic mechanism (not shown in FIG. 1) which is capable of both firing the spikes 3 and pulling them back in order to thereby release a spiked rat. This mechanism will be described in further detail in the following with reference to FIGS. 2 and 3.

Figure 2:
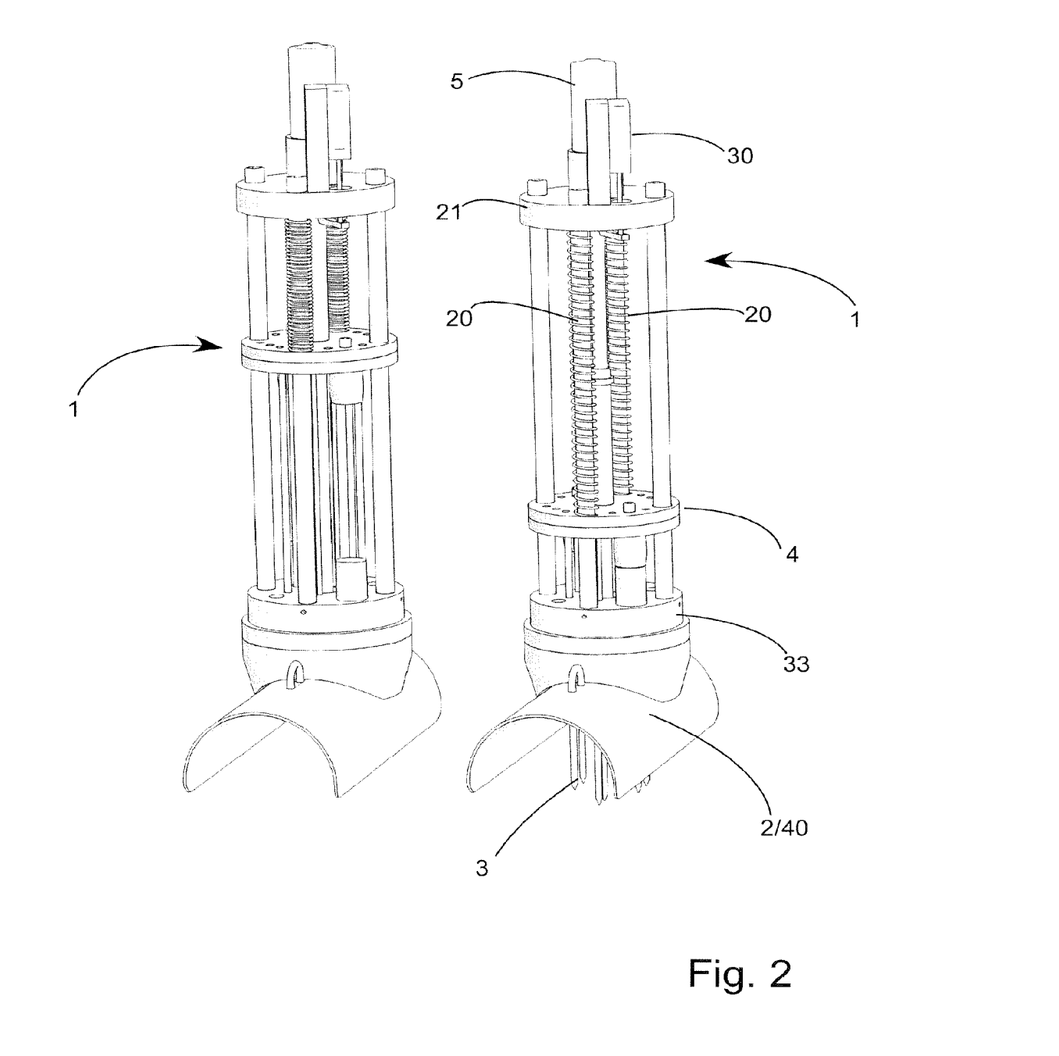
FIG. 2 schematically shows two depictions of an embodiment of the rat trap with the spring mechanism more or less tightened.

FIG. 2 shows a rat trap 1. The rat trap comprises a plate 2 with a first side and a second side and having a number of through-going openings from the first side to the second side. The rat trap is provided with a number of spikes 3 that are secured to an anchoring plate 4. This anchoring plate is arranged on the first side—being in the depicted Figure the top face—of the plate. The spikes 3 are adapted to the openings in this plate 2 to the effect that the spikes are adapted not only to slide through the plate, rather spikes and openings are also adapted such that the circumference of the spikes corresponds essentially to the circumference of the openings.

The rat trap is automated in that the spikes 3 can both be fired and withdrawn by means of interior automatics. An embodiment of such automatics will be explained in further detail with reference to FIGS. 2 and 3. To supply energy to this firing and withdrawal mechanism, the rat trap is provided with an energy supply 5, such as eg a power supply in the form of a battery as shown at the top of the drawing. However, the power may also come from other sources, eg the mains system.

In order to detect the presence of an animal within the reach of the spikes, the rat trap is usually provided with an electronic sensor (not shown). This sensor may eg be an infrared sensor or other movement sensor, but of course nothing prevents other sensors from being used. The sensor may even rely entirely on mechanics.

If the sensor is based on infra-red measurement, one would usually arrange the sensor to measure approximately centrally of the face area within which the spikes hit. However, the sensor of the detector may also be based on other measurement methods that are capable of detecting the presence of a rat within a zone where the spikes are assumed to be able to kill the rat, be it eg by means of sound or movement, but, as mentioned, the sensor may also rely on mechanics.

The trap according to the present invention also comprises a light sensor (not shown) being in communication with the firing mechanism such that the firing mechanism or the electronic sensor is interrupted when light occurs that is above a given intensity. By providing the trap with means for switching off the firing mechanism when a light intensity above a given level occurs, it is possible to prevent accidents due to e.g., erroneous activation of the trap in case of ordinary localised work illumination, including e.g. also in daylight at ground level or in artificial work illumination at the bottom of a shaft. Such light-activated safety means may of course also be adapted to be such that they switch off the trap merely if a superposed well cover is opened in daylight.

In the shown trap 1 the firing mechanism is founded on a spring mechanism 20 which is arranged between the anchoring plate 4 and a stop means 21. In the shown mechanism the anchoring plate 4 is thus movable.

Springs 20 are selected to have so much spring power that the spikes 3 are moved at such speed and inertia through the openings in the plate that a rat is killed by the spikes when the firing mechanism is released.

The rat trap 1 is provided with a withdrawal mechanism which, after a given period of time, withdraws the spikes 3 through the openings in the plate 2. Thereby a (dead) rat spiked on the underside of the plate 2 is released, the plate 2 thus serving as stop means.

The firing mechanism and withdrawal mechanism as such are, in the example shown, based on is an electronic mechanism which is able to control and move the requisite mechanical parts of the trap and the functioning as such will be explained in further detail in the following in the context of FIG. 3.

Figure 3:
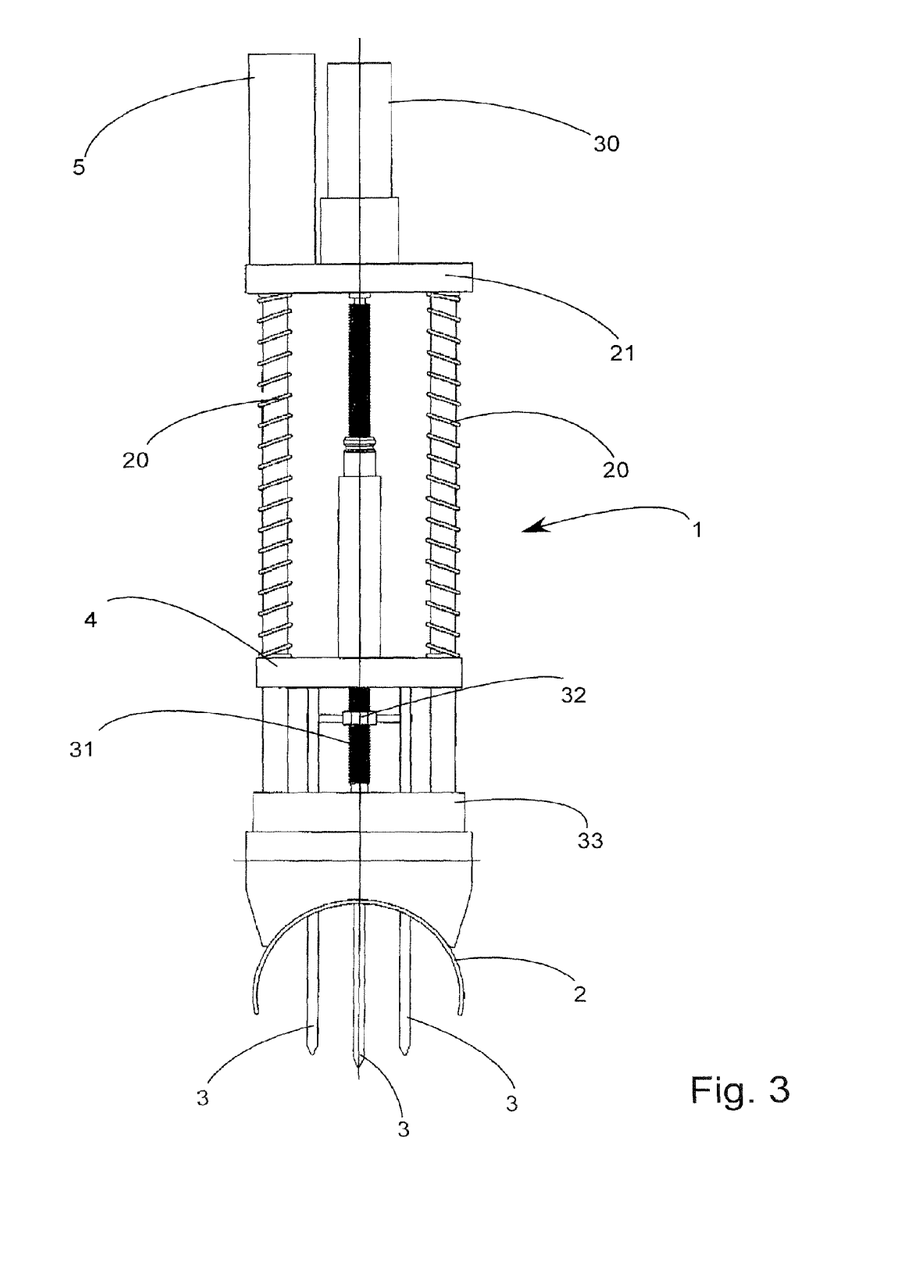
FIG. 3 schematically shows an embodiment of the rat trap.

FIG. 3 schematically shows an embodiment of a firing and withdrawal mechanism which will be explained in further detail in the following. When the trap 1 is to be used, it is turned on by means of a not shown switch, following which a motor 30 starts to rotate an associated thread spindle 31 to the effect that a nut 32 mounted thereon starts to move upwards (in the Figure). Of course, the nut is journalled in such a manner that it does not rotate with the spindle and, in the embodiment shown of the invention, this is accomplished by means of two arms that prevent a rotation of the nut, while simultaneously they allow an upwardly or downwardly oriented movement of the nut from a lower starting position (such as eg a position which is slightly lower than the position of the nut shown in FIG. 1). Since the thread spindle is journalled in an opening (a hole) in the anchoring plate 4 with sufficiently large fit for the anchoring plate 2 to slide effortlessly up and down the spindle without the plate 2 coming into contact with the thread of the spindle, the rotation of the spindle does not in itself influence the anchoring plate, but since, however, the nut (32) is unable to travel through this opening to the thread spindle, the anchoring plate 4 is pulled upwards when the nut hits it.

As the anchoring plate 4 moves upwards, the springs 20 are compressed and the compression goes on until the anchoring plate 4 has assumed a predetermined position, where experience has shown that the springs have absorbed enough energy for them to thrust the spikes out through the plate 2 with so much force that a rat within reach of the spikes is killed.

In this position the anchoring plate is subsequently locked by a (not shown) releasable locking mechanism and, in this position, the electronic control unit of the trap also stops rotation of the spindle.

Now, the control unit starts a counter-rotation of the spindle, which means that only the nut is moved downwards, the anchoring plate still being locked.

The downwards movement of the nut continues unit the nut has again essentially reached its lower starting position, following which the rotation is discontinued.

Now, the trap is ready for firing and when that takes place (due to eg the presence of a rat) the releasable locking mechanism releases the anchoring plate 4 which is then, at great speed, moved downwards until it hits a stop being, in the example shown, in the form of a plate 33.

On their way, the spikes have, with great speed and much force, exited on the other side of the plate 2 and are hence capable of killing a rat within their reach (on the underside of the plate 2). In order to be able to vary the inertia of this system and hence optimise the trap the plate is, according to a particular embodiment, equipped to allow mounting and dismounting of weight elements. If the trap is situated in a sewer pipe, the dead rat will eventually be flushed away by the water.

Albeit the trap is shown with a spring mechanism, the withdrawal mechanism may, of course, also be made in other ways. It may be constituted of eg an electromagnetic mechanism, such as eg a solenoid or a coil. By configuring the withdrawal mechanism around a solenoid it is possible to accomplish a very quick mechanism and this is why the same mechanism can also be used for firing the spikes, too. It could also be a pneumatic or a hydraulic mechanism. By configuring the withdrawal mechanism around such air- and/or liquid-based mechanisms, it is also possible to accomplish very quick and reliable mechanisms that can also be used for firing the spikes, too.

Figure 4:
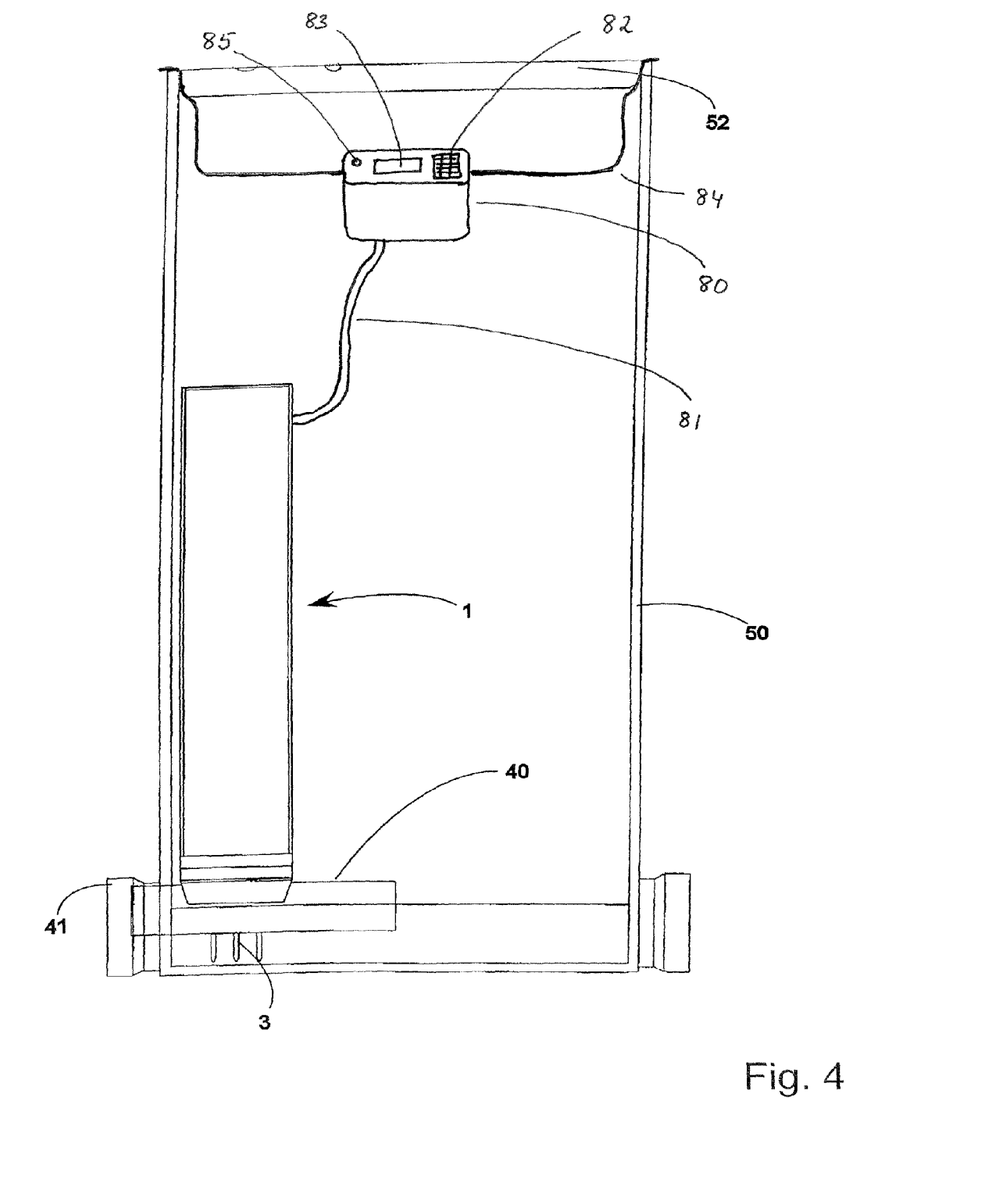
FIG. 4 shows an embodiment of the trap mounted in a sewer shaft.

FIG. 4 shows a trap according to the present invention comprising a trap housing 1 which is arranged at the bottom of a sewer shaft 50. The trap 1 is mounted on a mounting member 40 which in the shown embodiment is a flexible semi-cylindrical tubular member 40 that resiliently engages a sewer pipe 41 but the mounting member could also be in form of e.g., semi-cylindrical tubular member being provided with expanding means such that it is capable of engaging the inner side of a pipe. The resilient member 40 may be made out of steel but other materials may be used such as e.g. plastic.

In its unstressed state, the resilient tubular member 40 has an outer radius which slightly exceeds the inner radius of the sewer pipe 41. Thereby the trap is easily fastened therein merely by a trap fitter compressing the tubular member 40 to such suitable extent that the tubular member 40 can be inserted into the sewer pipe 41. Then the fitter inserts the tubular member 40 into the sewer pipe 41 and lets go of it, following which the tubular member 40 resiliently engages the inside of the sewer pipe 41. Even though the member 40 is describes as being made out of resilient material other solutions known to the skilled person may be used, such as e.g. mechanically expanding sleeves. For illustrative purposes, the trap is shown with the spikes out, but of course this is usually not the case unless the trap is to be serviced or the like.

FIG. 4 also shows a separate battery housing (80) being part of the trap but separate from the trap housing 1 and in this embodiment the battery housing is containing a battery (not shown), and the electronic control system (not shown) for the trap. An electric wiring is arranged in order to provide power from the battery to the trap housing 1, and also for connecting the various sensors and other equipment present in the trap housing 1 to the electronic control system. The battery housing 80 furthermore provides a keyboard 82 for programming the electronic control system as well as a display 83 for displaying information regarding the status of the trap. This information could e.g. be an indication showing the number of rats killed and/or battery charge. The battery housing 80 is placed in a bracket 84 mounted in the upper part of the well, so that exchange of battery as well as monitoring of the trap is easily accessible without the need of removing the trap housing.

A separate battery housing as well as the embodiments of such a separate battery housing suggested in this document will also be applicable to traps in general having powered means for killing rats, and whether or not having light sensors as disclosed by the present invention. The skilled person would easily recognize that the advantages provided by having a separate battery housing as mentioned and e.g. a separate control system, would also be obtained in relation to rat traps in general.

Furthermore the battery housing also comprises a light sensor 85 being connected to the electronic control system for deactivating the trap e.g. when the well cover is removed from the sewer shaft.

Figure 5:
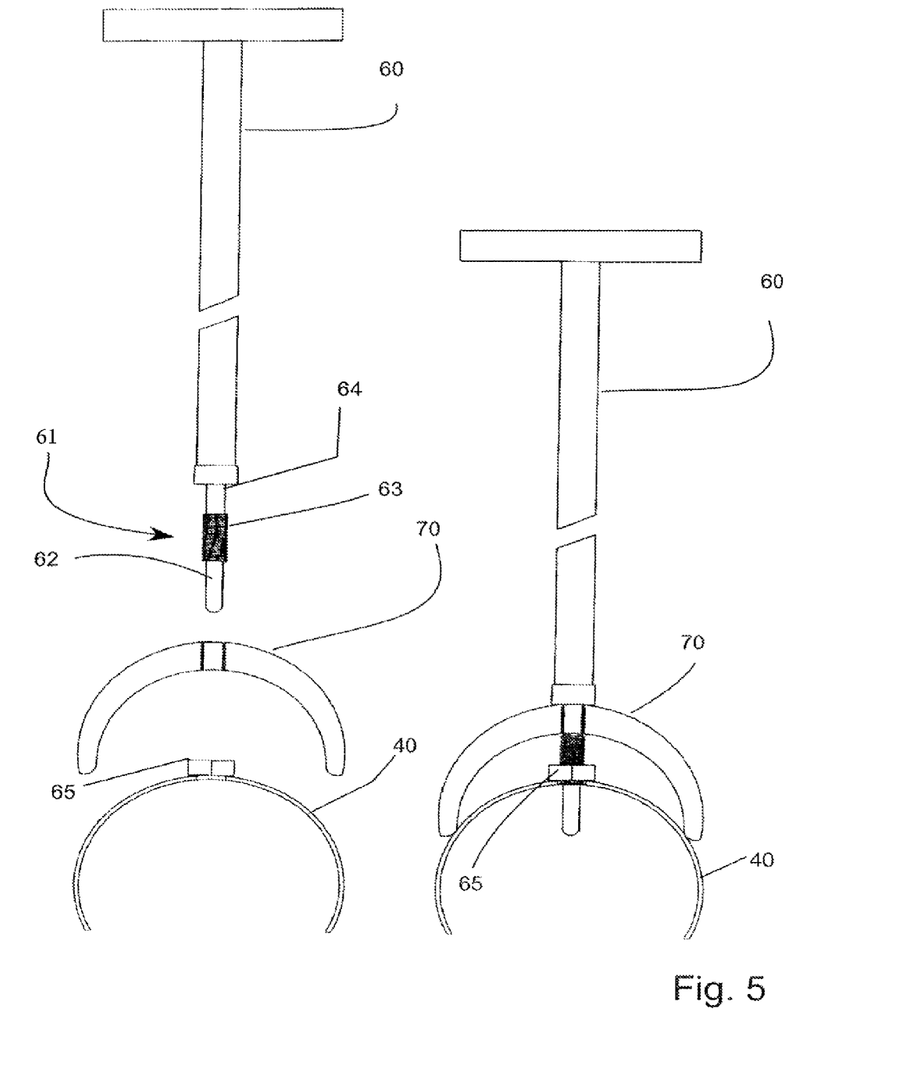
FIG. 5 shows a tool for mounting a rat trap in a sewer pipe.

FIG. 5 shows a tool for mounting a trap in a sewer shaft and the functionality of it will be explained in further detail in the following. The tool consists of two parts: a handle part 60 and a stop plate 70. Moreover, the figure also shows a resilient tubular member 40. As explained above, the trap will usually be arranged on the tubular member (40), but for the sake of clarity this is not the case in the depiction shown in FIG. 5.

The handle part is provided with a mounting pin 61, being in the shown embodiment divided into three pieces 62, 63, 64, where only the middlemost part 63 is provided with thread. The mounting pin is adapted to the stop plate 70 in such a manner that the thread mates with corresponding thread in the stop plate, and the thread-less part of the mounting pin 64 which is situated after the thread 63 is adapted to the thickness of the stop plate to the effect that the mounting pin 62, 63, 64 can be turned so far into the stop plate 70 that the thread 63 on the mounting pin 61 does not engage with the thread of the stop plate. Like the stop plate, the resilient tubular member 40 is provided with a thread mating with the thread on the mounting pin 60. That thread can be constituted (as shown in the Figure) of a nut 65, but of course the thread can be made in a variety of other ways.

When the tool is to be used, one starts out by mounting the stop plate 70 on the mounting pin 61 and subsequently turning it so far that the threads are no longer in engagement. Then one may turn the thread 63 of the mounting pin into the nut on the tubular element 40 and thereby the tubular member 40 is pulled into the convex portion of the stop plate. During this process the tubular member 40 is deformed (compressed). The fitter continues this deformation until the tubular member 40 can be pressed into the sewer pipe where the trap is to be mounted (not shown), following which the fitter deploys the trap simply by turning the mounting pin out of engagement with the tubular member 40.

Even though the stop plate 70 can be secured to the mounting pin in many ways, eg by means of a known split pin system (arranged on the top face of the thread portion 63 or a corresponding place) the embodiment as shown in FIG. 5 is associated with the advantage that several sizes of stop plates (different diameters/curvatures) can be mounted on the same mounting pin 61. Thereby the fitter needs only one handle part which can then be used for several different (different diameters/curvatures) stop plates which he selects in response to the size of tubular element 49 (fitted with trap) to be mounted in a sewer.

Albeit the trap was explained in a scenario where the trap is mounted in a sewer pipe the trap may, of course, also be used elsewhere. Of course, it can also be used to kill other animals than rats. The electronic sensor as such is, in the above examples, described as a single sensor, but the presence of an animal may, of course, also be detected on the basis of several detections, such as eg detections of movement, light and/or heat. The hitting accuracy of the trap can, of course, also be increased by making the firing depend on one or more detection criteria being complied with prior to the trap being fired (such as eg that both movement and heat must be detected). Electronic/optical sensors for accurate detection of acceleration can also be used for detecting signs of life within the radius of the spikes.

According to one embodiment the rat trap comprises electronic means for transferring images or other parameters to a network, such as eg a mobile telephone network. Thereby the rat trap can be remote-monitored visually via eg the internet, and therefore it is also possible to perform a visual inspection of the surroundings of the trap or the technical functionality of the trap eg by enabling the trap to be remote-fired. Monitoring of the functionality of the trap can, of course, also be performed in other known ways, such as eg electronically.

The trap being a self-emptying device and hence less maintenance-intensive than other traps, the trap may advantageously also be equipped with means for other monitoring tasks. For instance, the trap may be equipped with one or more means for tasks such as monitoring and continuously recording the water level, flow rate, flow, water quality/pollution, PH value or temperature. The trap may be provided with a data storage consisting of eg reference values to the effect that it is able to perform a comparison of measured data there with and, based on this, provide an alarm if a value for one or more of the measured parameters falls outside the allowable reference values. The alarm as such may take place eg by means of sound, light or radio signals, eg through the mobile telephone net. If the trap is used for carrying out monitoring tasks such as eg analyses of the water quality in the well, the results can be stored electronically or be transferred by means of eg wireless technology, but of course the results can also be transferred from the rat trap to a receiver by means of other conventional technique such as eg wires, fibre optics cables or the like.

The invention claimed is:

1. A rat trap comprising:
a power supply;
a killing means for killing a rat;
a first sensor adapted to detect a presence of a rat in a space within a reach of the killing means;
a control means capable of receiving a signal from the first sensor, and being adapted for activating the killing means to kill the rat when the presence of the rat is detected by the first sensor;
an automatic mechanism adapted for releasing a dead rat from the rat trap;
a second sensor for detecting light; and
a storage module adapted for storing a battery state of the rat trap,
wherein the control means is configured for receiving a signal from the second sensor and adapted for deactivating the killing means or the first sensor at least for a period of time after a detection of a presence of light by the second sensor, and wherein the second sensor is adapted for sensing visible light, wherein the storage module is not deactivated when the control means deactivates the killing means or the first sensor after the detection of the presence of light by the second sensor, and
wherein the first sensor is adapted for sensing infrared light emitted by the rat, and the second sensor is adapted for sensing ambient light.

2. A rat trap according to claim 1, wherein the control means is adapted for deactivating the killing means when the second sensor senses light above a given intensity.

3. A rat trap according to claim 1, wherein the control means is adapted for deactivating the killing means when the second sensor senses that the ambient light intensity increases.

4. A rat trap according to claim 3, wherein a third sensor is mounted in the battery housing for detecting light, and the control means is capable of receiving a signal from the third sensor, and for deactivating the killing means or the first sensor for a period of time after a detection of light by the third sensor.

5. A rat trap according to claim 1, wherein the killing means is contained in a trap housing, and the power supply comprises a battery contained in a battery housing being separate from the trap housing, and electric wiring is arranged between the battery housing and the trap housing for conducting power from the battery to the trap housing.

6. A rat trap according to claim 5, wherein the second sensor is mounted in the trap housing.

7. A rat trap according to claim 1, wherein the control means is contained in the battery housing.

8. A rat trap according to claim 7, wherein the rat trap comprises electronic means for wireless transfer of operational parameters to a receiver unit at ground level.

9. A rat trap according to claim 1, wherein the storage module is further adapted for storing a number of times that the killing means is activated.

10. A rat trap according to claim 1, wherein the rat trap further comprises:
   a resilient tubular mounting member, wherein the mounting member is shaped and sized to engage an inner surface of a horizontally extending sewer pipe; and
   a housing, wherein the housing has a vertical dimension greater than a diameter of the sewer pipe.

11. A rat trap according to claim 1 wherein the killing means comprises:
   an anchor plate;
   a spindle extending through the anchor plate; and
   a nut coupled to the spindle,
   wherein when the spindle is rotated in a first direction, the nut rises along the spindle and translates the anchor plate in an upward direction,
   wherein when the anchor plate is translated to a set position, the anchor plate is secured at the set position, and
   wherein when the anchor plate is secured at the set position and the spindle is rotated in a second direction opposite the first direction, the nut descends along the spindle without translating the anchor plate.

12. A rat trap comprising:
   a power supply;
   a killing means for killing a rat;
   a first sensor adapted to detect a presence of a rat in a space within a reach of the killing means;
   a control means capable of receiving a signal from the first sensor, and being adapted for activating the killing means to kill the rat when a presence of the rat is detected by the first sensor;
   an automatic mechanism adapted for releasing a dead rat from the rat trap;
   a second sensor for detecting light; and
   a storage module adapted for storing a battery state of the rat trap,
   wherein the control means is configured for receiving a signal from the second sensor and adapted for deactivating the killing means or the first sensor at least for a period of time after a detection of a presence of light by the second sensor, and wherein the second sensor is adapted for sensing visible light,
   wherein the first sensor is adapted for sensing infrared light emitted by the rat, and the second sensor is adapted for sensing ambient light;
   wherein the rat trap further comprises:
      a resilient tubular mounting member, wherein the mounting member is shaped and sized to engage an inner surface of a horizontally extending sewer pipe; and
      a housing, wherein the housing has a vertical dimension greater than a diameter of the sewer pipe.

13. A rat trap comprising:
   a power supply;
   a killing means for killing a rat;
   a first sensor adapted to detect a presence of a rat in a space within a reach of the killing means;
   a control means capable of receiving a signal from the first sensor, and being adapted for activating the killing means to kill the rat when the presence of the rat is detected by the first sensor;
   an automatic mechanism adapted for releasing a dead rat from the rat trap;
   a second sensor for detecting light; and
   a storage module adapted for storing a battery state of the rat trap;
   wherein the control means is configured for receiving a signal from the second sensor and adapted for deactivating the killing means or the first sensor at least for a period of time after a detection of a presence of light by the second sensor, and wherein the second sensor is adapted for sensing visible light,
   wherein the first sensor is adapted for sensing infrared light emitted by the rat, and the second sensor is adapted for sensing ambient light;
   wherein the killing means comprises:
      an anchor plate;
      a spindle extending through the anchor plate; and
      a nut coupled to the spindle,
      wherein when the spindle is rotated in a first direction, the nut rises along the spindle and translates the anchor plate in an upward direction,
      wherein when the anchor plate is translated to a set position, the anchor plate is secured at the set position,
      wherein when the anchor plate is secured at the set position and the spindle is rotated in a second direction opposite the first direction, the nut descends along the spindle without translating the anchor plate.

14. Method of installing a rat trap which comprises placing the trap of claim 1 in a sewer shaft in front of a sewer pipe entrance.

* * * * *